(12) United States Patent
Mohri et al.

(10) Patent No.: US 6,824,299 B2
(45) Date of Patent: Nov. 30, 2004

(54) MARKER LAMP FOR A VEHICLE

(75) Inventors: Fumihiko Mohri, Toyota (JP); Hiroki Fujinami, Shimizu (JP); Hideyuki Aihara, Shimizu (JP); Norihiro Nishitani, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/322,967

(22) Filed: Dec. 18, 2002

(65) Prior Publication Data

US 2003/0112634 A1 Jun. 19, 2003

(30) Foreign Application Priority Data

Dec. 19, 2001 (JP) ........................................ 2001-385856

(51) Int. Cl.[7] .............................................. B60Q 1/00
(52) U.S. Cl. ...................... 362/487; 362/498; 362/499; 362/521; 362/540; 362/541; 362/545; 362/300; 362/34; 340/815.45; 340/479
(58) Field of Search ................................ 362/487, 498, 362/499, 521, 540, 545, 300, 34; 340/815.45, 479

(56) References Cited

U.S. PATENT DOCUMENTS

| 4,733,335 | A | | 3/1988 | Serizawa et al. |
| 5,455,747 | A | * | 10/1995 | Aoyama ..................... 362/545 |
| 6,508,578 | B2 | * | 1/2003 | Yoda et al. ................. 362/545 |

FOREIGN PATENT DOCUMENTS

| GB | 2 288 658 B | 4/1998 |
| GB | 2 348 324 B | 3/2001 |

* cited by examiner

*Primary Examiner*—Stephen Husar
*Assistant Examiner*—Bertrand Zeade
(74) *Attorney, Agent, or Firm*—Koda & Androlia

(57) ABSTRACT

A marker lamp for a vehicle that has a tail lamp function and a stop lamp function including a bulb, light-emitting diodes and a reflector which are disposed in a lamp chamber defined by a lamp body and a front cover that covers the front portion of the lamp body. The bulb is positioned at the center of the reflector, the reflector is formed with a plurality of openings around the bulb and a primary reflective surface that reflects the light from the bulb substantially forward, and the light-emitting diodes are disposed so as to surround the bulb and face the front cover through the openings formed in the reflector. The tail lamp function is executed by lighting the bulb, and the stop lamp function is executed by lighting the light-emitting diodes.

14 Claims, 2 Drawing Sheets

MARKER LAMP FOR A VEHICLE

BACKGROUND OF THE INVENTION

1. Field of the Invention

The present invention relates to a vehicle lamp and more particularly to a marker lamp for a vehicle called a tail and stop lamp.

2. Prior Art

A vehicle lamp called a marker lamp for a vehicle such as an automobile tail and stop lamp functions as a tail lamp and as a stop lamp by way of emitting red lights at two different levels of intensity. When it functions as a tail lamp, it emits red light of low intensity; and when it functions as a stop lamp, it emits red light of high intensity.

A conventional tail and stop lamp uses as a light source an incandescent lamp that has two filaments and is called double (W) filament bulb. When it functions as a tail lamp, it lights the filament with an output of 5 W (watt); and when it functions as a stop lamp, it lights the filament with an output of 21 W.

Recently, the benefits of using a light-emitting diode as a light source for a marker lamp for a vehicle have drawn attentions, and a light-emitting diode has been employed as a light source for a tail and stop lamp.

Since light-emitting diodes consume little electric power, it is preferable to use light-emitting diodes as a light source of a lamp mounted on an automobile which, within a limited space, is only capable of loading a power source (i.e. battery) that has only a limited capacity. Further, light-emitting diodes takes a shorter period of time from when a current is supplied to when they reach the maximum intensity compared to incandescent lamps. Thus, light-emitting diodes provide good responsiveness to braking operation and are used preferably for assuring the traffic safety.

When arranging light-emitting diodes for the number that is sufficient enough to secure a required light amount as a stop lamp so that they function as light source of a tail and stop lamp, the lamp, in order to function as a tail lamp, needs to be lit in a lower intensity compared to when the lamp functions as a stop lamp. For this purpose, a circuit for varying luminous intensity into two levels between when the lamp functions as a tail lamp and when it functions as a stop lamp is required. However, such a control circuit is expensive, resulting in a problem that the cost of the tail and stop lamp tends to become high.

SUMMARY OF THE INVENTION

Accordingly, it is an object of the present invention to provide a marker lamp for a vehicle that can be manufactured at low cost, while making the maximum use of benefits of light-emitting diodes particularly for a good responsiveness to braking operation of a vehicle.

The above object is accomplished by a unique structure of the present invention for a vehicle marker lamp that has a tail lamp function and a stop lamp function in which the tail lamp function allows the rear of a vehicle to be recognized from behind while driving in the dark, and the stop lamp function allows the braking of a vehicle to be recognized from behind while braking; and in the present invention, the marker lamp is comprised of a bulb, a plurality of light-emitting diodes, and a reflector which are provided in a lamp chamber defined by a lamp body and a front cover that covers the front of the lamp body, wherein the bulb is positioned at substantially the center of the reflector, the reflector is formed with a primary reflective surface and a plurality of openings in which the primary reflective surface reflects the light from the bulb substantially forward, and the light-emitting diodes are disposed so as to face forward through the openings of the reflector; and the tail lamp function is executed by lighting the bulb, and the stop lamp function is executed by lighting the light-emitting diodes.

In the marker lamp for a vehicle according to the present invention, the bulb is used as the light source for the tail lamp which is always lit while driving in the dark and is less responsible in terms of functional responsiveness, and the light-emitting diodes having an excellent responsiveness are used as the light sources for the stop lamp for which responsiveness during braking is important. Thus, the lamp well contributes to the traffic safety. Further, since the marker lamp does not require a circuit for lighting the light-emitting diodes in two levels, the lamp can be manufactured at low cost. In addition, the bulb, which consumes a large amount of electric power, is lit with 5 W power output to function as a tail lamp; and the light-emitting diodes are employed in place of a filament that requires an output of 21 W. As a result, the entire electric power consumption can be small.

Furthermore, when the marker lamp functions as a stop lamp, the portions different from those that are lit when it functions as a tail lamp are lit in a high intensity. Thus, the manner in which the lamp is lit differs greatly between when it functions as a tail lamp and when it functions as a stop lamp. This gives a strong impression to a person who sees the lamp, for example, the driver of a vehicle behind and the like, drawing a great amount of attention. Also from this aspect, the marker lamp of the present invention well contributes to the traffic safety.

DETAILED DESCRIPTION OF THE INVENTION

Embodiments of the marker lamp for a vehicle according to the present invention will be described with reference to the accompanying drawings. In the following embodiments, the present invention will be described on a tail and stop lamp for an automobile.

In the tail and stop lamp 1 of the present invention, a lamp chamber 4 is formed by covering the front face of the recess portion of a lamp body 2 with a front cover 3. The front cover 3 is a so-called plain cover that involves no lens elements such as fish-eye steps.

Figure 2:
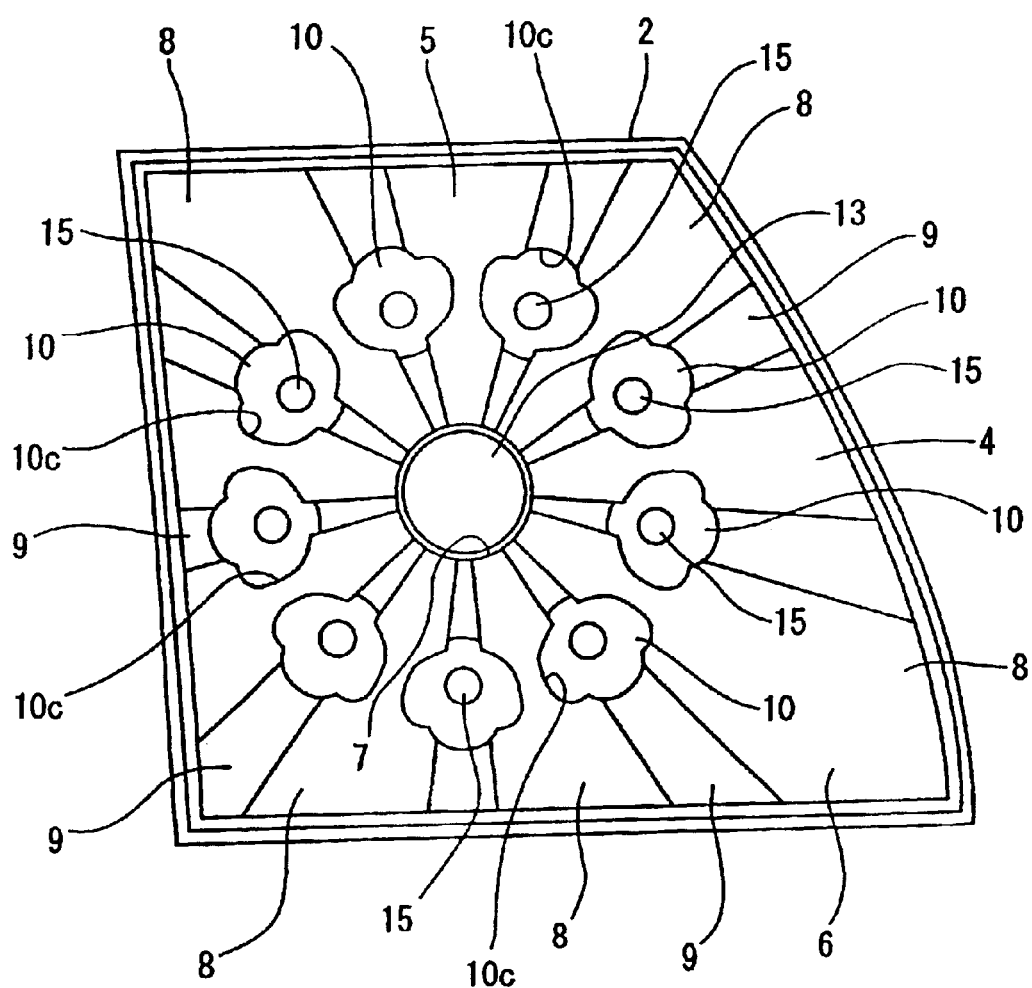
FIG. 2 is a front view of the lamp with the front cover removed.

A substantially concave reflector 5 is disposed in the lamp chamber 4 so as to face the front (a vehicles' back) or the front cover 3. A reflective surface 6 of the reflector 5 is formed by providing thereon a reflective membrane by means of aluminum deposition or the like. In a substantially central portion of the reflector 5, a bulb insertion hole 7 is formed into which a bulb to be described later is inserted. The reflective surface 6 is segmented into reflective elements 8 and 9 as best seen from FIG. 2, each constituting a substantially narrow fan-shaped area that extends radially from the bulb insertion hole 7 toward the periphery. Thus, the reflector 5 is a so-called step reflector.

Figure 1:
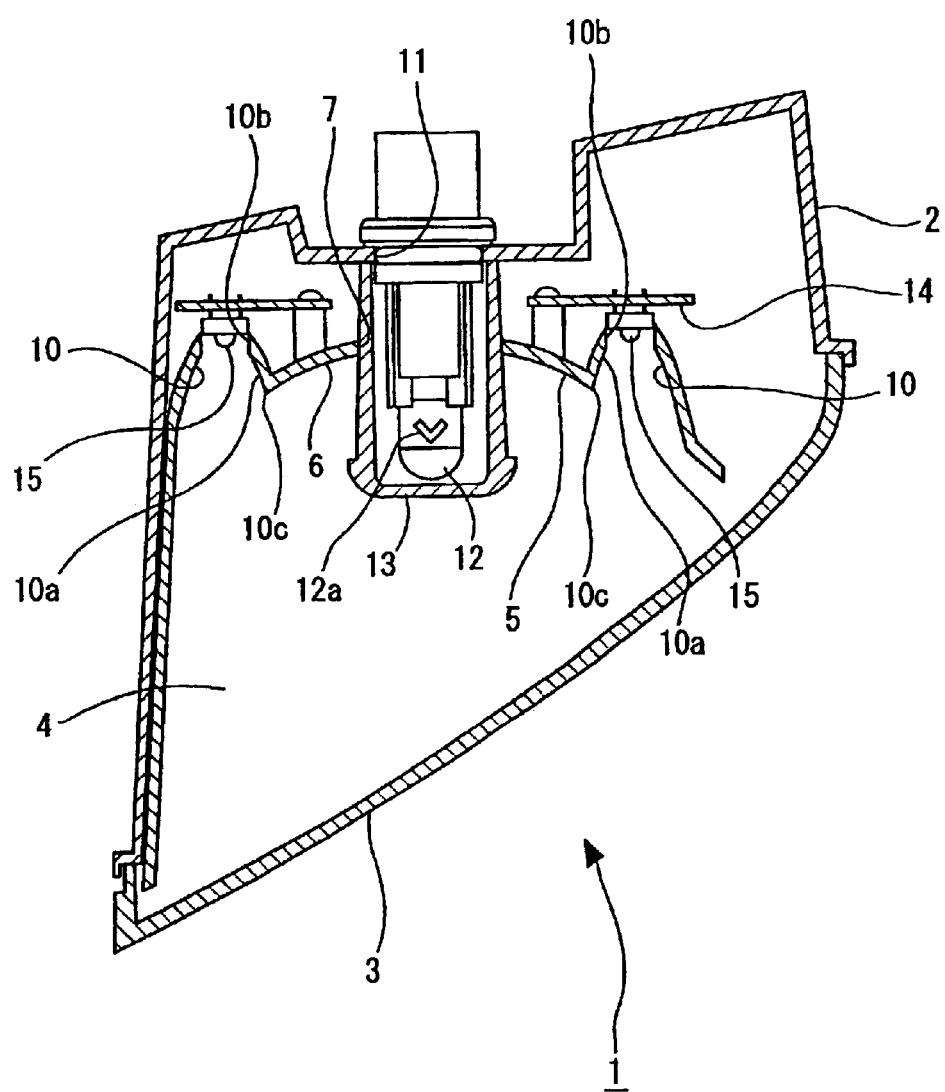
FIG. 1 shows in cross-section one embodiment of a marker lamp for a vehicle according to the present invention.

On the reflector 5, a plurality of recess portions 10 are formed to surround the bulb insertion hole 7. The recess portions 10 are respectively provided so that they are or the centers thereof are located on the reflective elements 9. The recess portions 10 project rearward or in the direction opposite from the front cover 3 as seen from FIG. 1, and inner surfaces 10a thereof are formed to be reflective surfaces. Also, LED (light-emitting diode) insertion holes 10b are formed in the rear end of the recess portions 10. Openings 10c of the recess portions 10 allow the light-emitting diodes to be described later to face forward or face the front cover 3.

A bulb attachment hole 11 is formed in the rear portion of the lamp body 2, and a bulb 12 with an output of, for instance, 5 W is fitted therein in a detachable manner. The bulb 12 is inserted into the bulb insertion hole 7 of the reflector 5, and the light emitting portion 12a of the bulb 12 is positioned on the reflective surface 6 side of the reflector 5. The bulb 12 is covered with a dome-shaped red and transparent cap 13.

An LED circuit board 14 is provided behind the reflector 5, and a plurality of light-emitting diodes 15 are disposed on the LED circuit board 14. The light-emitting diodes 15 on the LED circuit board 14 are inserted into the LED insertion holes 10b of the recess portions 10 of the reflector 5 so that the light-emitting diodes 15 are positioned in the recess portions 10 and face forward or face the front cover 3 through the openings 10c.

With the structure described above, in the tail and stop lamp 1, the light-emitting diodes 15 are lit in red in response to braking operation. Then, the lights from the light-emitting diodes 15 are irradiated directly and reflected forward or toward the front cover 3 by the inner surfaces 10a of the recess portions 10. The lamp 1 thus functions as a stop lamp.

While driving in the dark, the bulb 12 is lit. The light from the bulb 12 passes through the cap 13 in red and is irradiated directly and reflected forward or toward the front cover 3 by each of the reflective elements 8 and 9 of the reflector 4. The lamp 1 thus functions as a tail lamp.

The tail and stop lamp 1 uses the light-emitting diodes 15 for the light source which are lit during braking operation. Thus, the lamp 1 has high response rate to braking operation, contributing the traffic safety. Further, since the light-emitting diodes 15 are lit at a certain intensity, there is no need to use expensive circuits for emitting light at two levels of intensity, and the lamp can be manufactured at low cost.

In addition, the bulb 12 that is kept lit in the dark so as to function as a tail lamp can be a low output bulb. Thus, electric power can be saved.

Furthermore, since the bulb 12 can be a low output bulb, the bulb 12 can be compact in size; and as a result, the red cap 13 that covers the bulb 12 can be compact also. Thus, when the lamp is not lit, the color of the reflective surface 6 of the reflector 5 is dominant, not allowing the inside of the lamp chamber 4 to be seen in red, and the lamp as a whole appears whitish. When the lamp is lit, then the lamp appears red. This difference in color gives a novel appearance to a person who sees the lamp. Even when the lamp is lit and appears red, the red light of different brightness comes from different locations when it functions as a tail lamp and when it functions as a stop lamp. The lamp thus provides a novel appearance.

In the above-described embodiment, the red cap 13 is attached to cover the bulb 12 so that the lamp 1 emits red light when the bulb 12 is lit. Instead, a bulb colored in red can be used; and in this case, the red cap 13 is unnecessary.

Further, though the step reflector 5 is used in the embodiment, it is not essentially necessary to use a step reflector. Also, even in a case where the step reflector is used, the shape of each of the reflective elements is not limited to a fan-shaped one that extends radially as shown in the above embodiment.

Also, instead of the plain front cover 3, a cover formed thereon with lens elements such as fish-eye steps can be employed.

The shape and the structure of each element in the above-described lamp are mere illustrations of one example of the embodiments of the present invention, and the technical scope of the present invention should not be limited thereby.

As is apparent from the above, the marker lamp for a vehicle according to the present invention includes a bulb, a plurality of light-emitting diodes, and a reflector which are installed in a lamp chamber that is defined by a lamp body and a front cover which covers the front of the lamp body; and the bulb is positioned at substantially the center of the reflector, the reflector has a primary reflective surface for reflecting the light from the bulb substantially forward and has a plurality of openings, the light-emitting diodes are disposed so as to face forward through the openings; and the tail lamp function is executed by lighting the bulb, and the stop lamp function is executed by lighting the light-emitting diodes.

In the marker lamp of the present invention, the bulb is used as the light source for the tail lamp which is always lit while driving in the dark and is less responsible in terms of functional responsiveness, and the light-emitting diodes having an excellent responsiveness are used as the light sources for the stop lamp for which responsiveness during braking is important. Thus, the lamp well contributes to the traffic safety. Further, since the marker lamp does not require a circuit for lighting the light-emitting diodes in two levels, the lamp can be manufactured at low cost. In addition, the bulb, which consumes a large amount of electric power, is lit with 5 W power output to function as a tail lamp; and the light-emitting diodes are employed in place of a filament that requires an output of 21 W. As a result, the entire electric power consumption can be small.

Furthermore, when the marker lamp functions as a stop lamp, the portions different from those that are lit when it functions as a tail lamp are lit in a high intensity. Thus, the manner in which the lamp is lit differs greatly between when it functions as a tail lamp and when it functions as a stop lamp. This gives a strong impression to a person who sees the lamp, for example, the driver of a vehicle behind and the like, drawing a great amount of attention. Also from this aspect, the marker lamp of the present invention well contributes to the traffic safety.

In the present invention, since the openings are annularly disposed around the bulb, when the lamp functions as a stop lamp, the surroundings of the portions that are lit when it functions as a tail lamp appear annularly brighter, providing an appearance which the existing lamps cannot provide.

Also, the openings are formed as openings of the recess portions that project rearward, and the inner surfaces of the recess portion are reflective surfaces for reflecting the light from the light-emitting diode substantially forward or to toward the front cover. Accordingly, not only the direct light from the light-emitting diodes but also the light reflected by the inner surfaces of the recess portions are irradiated forward and out of the lamp chamber. This enables an area of the portion which is lit brightly when the lamp functions as a stop lamp to appear larger.

In addition, in the present invention, the front cover has a plain translucent portion which is transparent and colorless and has no lens element such as a fish-eye step, the bulb is covered by a red cap or a red glass bulb is used, and the light-emitting diodes are disposed so as to be visible from the front through the translucent portion of the front cover. Accordingly, the light-emitting diodes that are colorless when not lit emit red lights when lit and give a strong impression as if the light sources are increased, providing a novel appearance to a person who sees the lamp.

Furthermore, in the present invention, the primary reflective surface of the reflector is a step reflector composed of a plurality of segmented reflective elements, and the reflective elements extend radially from a position where the bulb is disposed. The lamp thus gives a novel appearance to a person who sees the lamp in this aspect either.

What is claimed is:

1. A marker lamp for a vehicle having a tail lamp function and a stop lamp function, the tail lamp function allowing a rear of a vehicle to be recognized while driving in the dark, and the stop lamp function allowing braking of the vehicle to be recognized while braking, wherein the marker lamp is comprised of a bulb, a plurality of light-emitting diodes, and a reflector which are provided in a lamp chamber defined by a lamp body and a front cover that covers the lamp body, and wherein the bulb is disposed at substantially a center of the reflector, the reflector is provided with a primary reflective surface and a plurality of openings, the primary reflective surface reflecting light from the bulb toward the front cover, the light-emitting diodes are disposed so as to face the front cover through the openings, and the tail lamp function is executed by lighting the bulb, and the stop lamp function is executed by lighting the light-emitting diodes.

2. The marker lamp for a vehicle according to claim 1, wherein the openings are disposed annularly around the bulb.

3. The marker lamp for a vehicle according to claim 1, wherein the openings are formed as openings of recess portion provided in the reflector so as to project oppositely from the front cover, and inner surfaces of the recess portions are formed as reflective surfaces that reflect light from the light-emitting diodes toward the front cover.

4. The marker lamp for a vehicle according to claim 1, wherein the front cover has a plain translucent portion which is transparent and colorless without a lens element formed thereon, and the light-emitting diodes are disposed so as to be visible through the translucent portion of the front cover.

5. The marker lamp for a vehicle according to claim 1, wherein the bulb is covered by a red cap.

6. The marker lamp for a vehicle according to claim 1, wherein the bulb is a red glass bulb.

7. The marker lamp for a vehicle according to claim 1, wherein the primary reflective surface of the reflector is a step reflector formed with a plurality of segmented reflective elements, and the reflective elements are formed so as to extend radially from a position where the bulb is disposed.

8. The marker lamp for a vehicle according to claim 2, wherein the openings are formed as openings of recess portion provided in the reflector so as to project oppositely from the front cover, and inner surfaces of the recess portions are formed as reflective surfaces that reflect light from the light-emitting diodes toward the front cover.

9. The marker lamp for a vehicle according to claim 8, wherein the primary reflective surface of the reflector is a step reflector formed with a plurality of segmented reflective elements, and the reflective elements are formed so as to extend radially from a position where the bulb is disposed.

10. The marker lamp for a vehicle according to claim 9, wherein the front cover has a plain translucent portion which is transparent and colorless without a lens element formed thereon, and the light-emitting diodes are disposed so as to be visible through the translucent portion of the front cover.

11. The marker lamp for a vehicle according to claim 10, wherein the bulb is covered by a red cap.

12. The marker lamp for a vehicle according to claim 6, wherein the bulb is a red glass bulb.

13. The marker lamp for a vehicle according to claim 4, wherein the bulb is covered by a red cap.

14. The marker lamp for a vehicle according to claim 4, wherein the bulb is a red glass bulb.

* * * * *